United States Patent [19]

Luboshez

[11] 4,198,366
[45] Apr. 15, 1980

[54] METHOD OF MULTI-SHEET PLEATING

[76] Inventor: Sergius N. Luboshez, 3530 Pinetree Ter., Falls Church, Va. 22041

[21] Appl. No.: 918,765

[22] Filed: Jun. 26, 1978

Related U.S. Application Data

[63] Continuation of Ser. No. 754,588, Dec. 27, 1976, abandoned.

[51] Int. Cl.² ............................................. B29C 17/02
[52] U.S. Cl. .................................. 264/129; 264/132; 264/282; 264/285; 264/339
[58] Field of Search ............... 264/129, 132, 287, 283, 264/285, 339, 282, 286; 93/84 R; 427/275, 256

[56] References Cited

U.S. PATENT DOCUMENTS

| | | | |
|---|---|---|---|
| 1,692,720 | 11/1928 | Connard | 264/282 |
| 2,874,754 | 2/1959 | Yost et al. | 223/30 |
| 3,257,486 | 6/1966 | Luboshez | 264/129 |
| 3,349,159 | 10/1967 | Luboshez | 264/282 |
| 4,058,582 | 11/1977 | Bierenbaum et al. | 264/289 |

*Primary Examiner*—James B. Lowe
*Attorney, Agent, or Firm*—John H. Leonard

[57] ABSTRACT

Two or more flat sheets of flexible material, at least one of which is transparent, are driven concurrently endwise along a path by successive advances at the same rate of travel while they are juxtaposed in direct face to face contact with each other. At one location along the path the sheets as a unit are pleated, heated, and pressed into a series of parallel, substantially identical flat pleats, with the pleats of each sheet interfitting corresponding pleats of the other sheet, and each pleat being partially overlapped by, and partially overlapping, those adjacent pleats of the same sheet between which it is positioned. While the sheets are held in flat pleated condition, they are cooled to set the pleats, and then are coated concurrently over the outwardly exposed face portions of their plates with light reflecting or decorative paint or flowable film forming material. The coating is then dried. The resultant pleated and coated sheets can be tensioned to open the pleats, whereupon they display coated or show portions alternating with uncoated or shade portions. The set pleats normally remain relatively flat, but they are resilient, and consequently can be opened to desired degrees by tensioning the sheets endwise. Upon release of the tensioning force, the pleats self-restore to their flat condition.

9 Claims, 11 Drawing Figures

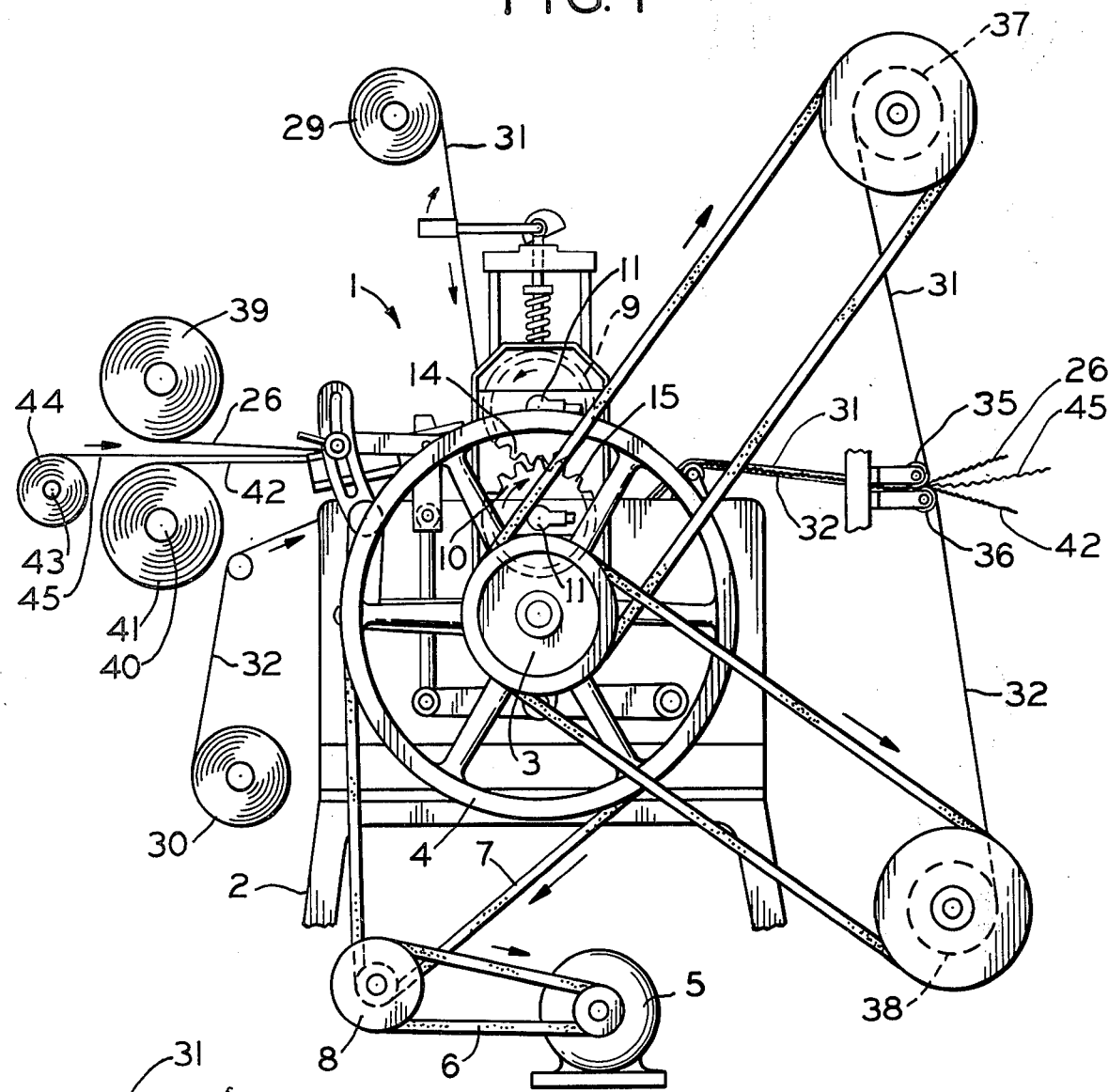
FIG. 1
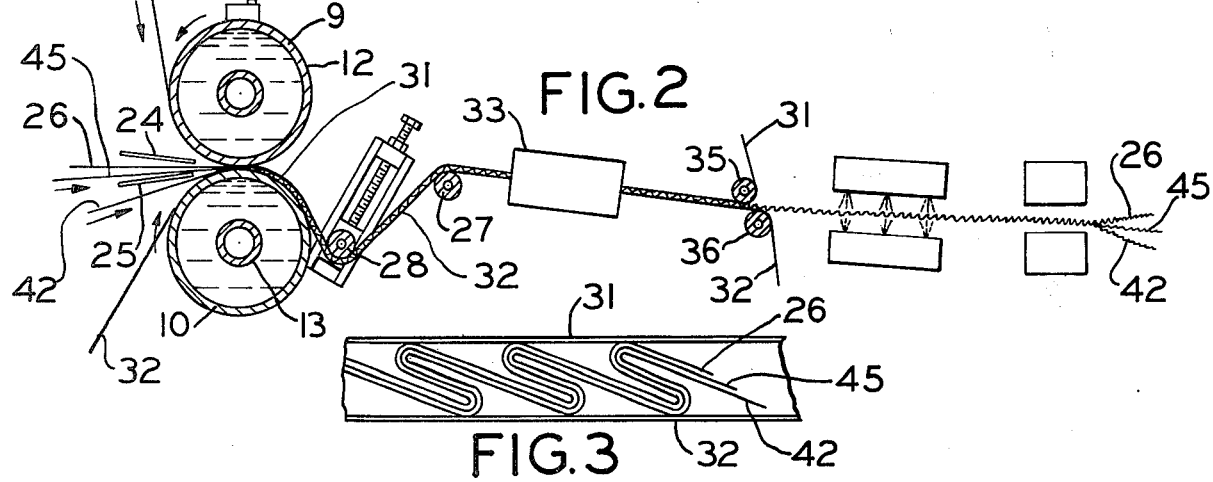
FIG. 2
FIG. 3

METHOD OF MULTI-SHEET PLEATING

This is a continuation of application Ser. No. 754,588, filed Dec. 27, 1976, now abandoned.

BACKGROUND OF INVENTION (1) Field of Invention

Method of pleating sheet material.

(2) Prior Art

In my U.S. Pat. No. 3,349,159, issued Oct. 24, 1967, a method and apparatus are disclosed for pleating transparent plastic sheet material of the thickness disclosed therein and in my U.S. Pat. No. 3,257,486, issued Jan. 21, 1966, referred to in U.S. Pat. No. 3,349,159. Therein the sheet material is pulled from a roll lengthwise, passed by short successive advances through a pleating device by which, between advances, it is pleated, and from which it is passed immediately between heated compression rolls which heat and iron the pleats into flat condition.

It had been found that, if, before setting, the sheet were unconfined flatwise, it could not be pulled along its path adequately by endwise tension as the tensioning force opened and pulled out the pleats so that they would become set in partially open or overextended condition. To maintain the pleated sheet in the flat pressed condition from the instant of pleating, during heating, and until the pleats are cooled and set, the pleated sheet is confined between ironing or confining sheets of paper which are drawn from suitable rolls and pass between the heating and pressing rollers while in fixed direct face to face contact with opposite faces, respectively, of the pleated sheet. These confining sheets remain in contact with the pleated sheet, one at each face, until the pleats are set, and then, they are separated from the plastic sheet and rewound into rolls for reuse.

With very thin plastic sheets, such as from 1 to 10 mils in thickness, as disclosed in said U.S. Pat. Nos. 3,349,159 and 3,257,486, consistency in the finished product is difficult to obtain at all times by this prior method and machine. The thin sheets sometimes gather, wrinkle, or pull and stretch to different degrees at different localized areas with resultant unwanted variations in shape and inaccuracy in dimension. The sometimes erratic behavior of the thin sheets seemed to result not only from the low resistance of the sheet to wrinkling and to localized stretching, but also from slight differences in moisture in the sheet at different times and areas, and from differences in the humidity of the atmosphere at the immediate site. Furthermore, since the pleating is done one sheet at a time, the production is limited.

SUMMARY

In accordance with the present invention, these difficulties in pleating such thin plastic sheet material of from 1 to 10 mils in the thickness are eliminated by feeding with a plastic sheet, a companion sheet, in underlying or overlying face to face contact therewith, beginning at a location in advance of the pleating site and continuing to a location at which the plastic sheet has become permanently set in flat pleated condition.

The companion sheet may be a like plastic sheet or paper. By using paper as the companion sheet, the amount of moisture in the plastic sheet at the pleating and hot pressure rolling sites is less critical. In this manner two pleated sheets can be made concurrently with the same apparatus operating at the same speed and in the same manner as theretofore used for one sheet. Thus two correspondingly pleated sheets are obtained in the same operation. If the companion sheet is paper, it is useful for decorative and other purposes. If both sheets are of like plastic, with or without any companion paper sheet, two duplicate pleated plastic sheets, instead of a single pleated plastic sheet, are made in the same operation. The two can be coated concurrently, one on its outwardly exposed upper pleated face and the other on its outwardly exposed lower pleated face.

This concurrent feeding of two sheets through the prior machine is advantageous because of the higher resistance to wrinkling and stretching of the two sheets as a unit, as compared to a single sheet, each sheet acting as a companion for the other.

If a paper companion sheet is fed along the path with the two plastic sheets, preferably it is disposed therebetween so that the upper and lower faces of the plastic sheets still can be coated or painted concurrently while their pleats interfit those of the paper sheet, and before any of the sheets issue from the machine.

After coating, the two pleated plastic sheets, made as above described, can be separated facewise. If, when separated, one of them is rotated relative to the other 180° about a longitudinal axis in its plane, and then rotated relative to the other 180° about a vertical axis normal to its plane, the two sheets will present identically contoured and coated outer faces; with like pleats and show and shade areas, and with the pleats of one having the same orientation as the pleats of the other.

In the present invention, the apparatus shown for performing the method is modified so as to employ endless belts, instead of rolls of paper, for confining the pleated sheets until they are permanently set.

Various other objects and advantages will become apparent from the following description wherein reference is made to the drawings.

BRIEF DESCRIPTION OF THE DRAWINGS

FIG. 1 is a fragmentary side elevation of a machine like that of my above patent, but modified for performing the method of the present invention, part of the machine being shown diagrammatically;

FIG. 2 is an enlarged fragmentary cross sectional view showing a portion of the machine and illustrating the concurrent passage through the machine of two or more sheets to be pleated;

FIG. 3 is an enlarged fragmentary view illustrating the manner of holding the pleated sheets in flat pressed condition, with their pleats interfitting during passage through the machine;

Figure 4:
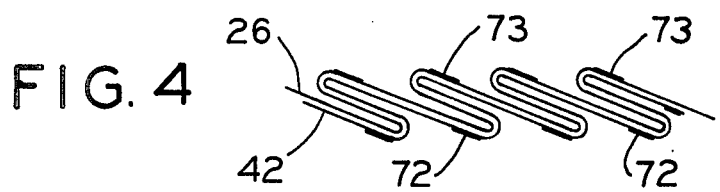
FIG. 4 is a fragmentary side elevation of a portion of two coated pleated sheets in flat pressed condition, showing the distribution of the coating thereon.
Figure 5:
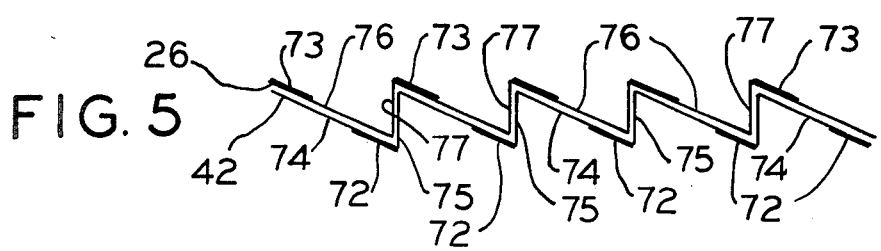
FIG. 5 is a side elevation of the fragments of sheets illustrated in FIG. 4, showing them when tensioned to open the pleats.

Referring to the drawings, the present machine may be the same, except for a few modifications, as the machine disclosed and illustrated in the above identified patent. As disclosed therein, and in FIGS. 1 and 2 hereof, the machine, indicated generally at 1, comprises a frame 2 which supports a horizontal drive shaft 3 on which is mounted a drive pulley 4, driven by a motor 5 by way of a series of belts 6 and 7 and an intermediate rotatable pulley 8.

Carried by the frame 2 are a pair of horizontal heating and pressing rollers 9 and 10 which may be heated by internal electrical heating elements 11, or by steam or otherwise. These rollers are co-rotatable about respective shafts 12 and 13, and preferably are held for accurate co-rotation by means of intermeshing gears 14 and 15, respectively. The roller 9 is biased firmly into contact with the lower roller 10 by means of a spring 20.

Positioned immediately in front of the rollers 9 and 10, and converging theretoward at an acute angle with respect to each other, are upper and lower pleating knives 24 and 25, respectively. These knives are operable to pleat a sheet 26, of plastic material, as it is passed therebetween.

All of the structure thus far described herein may be the same as in the patent, and hence their specific movements and functions are not described in detail. It need only be noted that the knives and rollers are driven by successive steps through the suitable ratchet and eccentric relations described in the patent, so that the plastic sheet material is advanced stepwise between the knives, is pleated thereby, and immediately is passed between the rollers 9 and 10.

Beyond the rollers 9 and 10 are a series of hollow cooling rolls 27 and 28. In order to hold the plastic sheet in flat condition after it is pleated and pressed flat, rolls of paper 29 and 30 are arranged in advance of the rollers 9 and 10. The papers therefrom, indicated at 31 and 32, corresponding in width with the sheet of plastic to be pleated, pass to the rollers 9 and 10 while juxtaposed against opposite faces of the outer faces of the sheet. These paper sheets remain in contact with the plastic sheet as it progresses through the machine beyond the pleating knives 24 and 25, passing therewith beneath the cooling roll 28 and over the cooling roll 27, and through an elongated cooling tunnel 33, if additional cooling is desired.

The pleated sheet and confining paper pass out of the machine over guide rolls 35 and 36, and then the paper sheets 31 and 32 pass outwardly in opposite directions, respectively, away from the pleated sheet 26, and onto suitable rolls 37 and 38 whereon they are rolled for reuse. The machine itself, above described, is the same as disclosed in my above identified patent.

Whereas, in my prior machine, a single plastic sheet 26 is fed from a roll 39, for example, through the machine, in the present machine, a support 40 is provided and supports a second roll 41 of sheet material 42. The sheets 26 and 42 pass from their respective rolls into face to face juxtaposition with each other and thence through the pleating knives whereby they are pleated concurrently with interfitting pleats which are essentially identical with each other. The sheet 26 from the roll 39 may be transparent plastic, such as MYLAR, and the sheet 42 from the roll 21 may be a companion sheet of paper. On the other hand, the sheets 26 and 42 may be identical plastic sheets of from about 1 to 10 mils in thickness. Whether both sheets 26 and 42 are plastic, or one is paper, each acts as a companion to the other, thereby imparting to the combination a higher resistance to localized wrinkling and stretching than would a single sheet. As mentioned, two plastic sheets, even though very thin as above mentioned, generally are sufficiently resistant to stretching, wrinkling, and sagging to be carried through the machine without the interposition of an additional carrier sheet. However, if desired, an additional roll support 43 may be provided for holding a roll 44 of paper, or plastic sheet, so that a paper or plastic sheet 45 may be fed between, and in face to face juxtaposition concurrently with, the two plastic sheets 26 and 42, and pleated therewith.

In the present instance, the two plastic sheets alone, or with a paper sheet therebetween, or a greater number of plastic sheets, with or without paper sheets therebetween, or with paper sheets overlying or underlying the plastic sheets, may be passed through the machine in the same manner as a single sheet.

Generally, if two plastic sheets are to be pleated concurrently with a paper sheet, the paper sheet is disposed therebetween so that the respective outwardly exposed faces of the pleated plastic sheets can be coated concurrently while the paper sheet remains therebetween with its pleats interfitting the corresponding plates in both plastic sheets.

Figure 9:
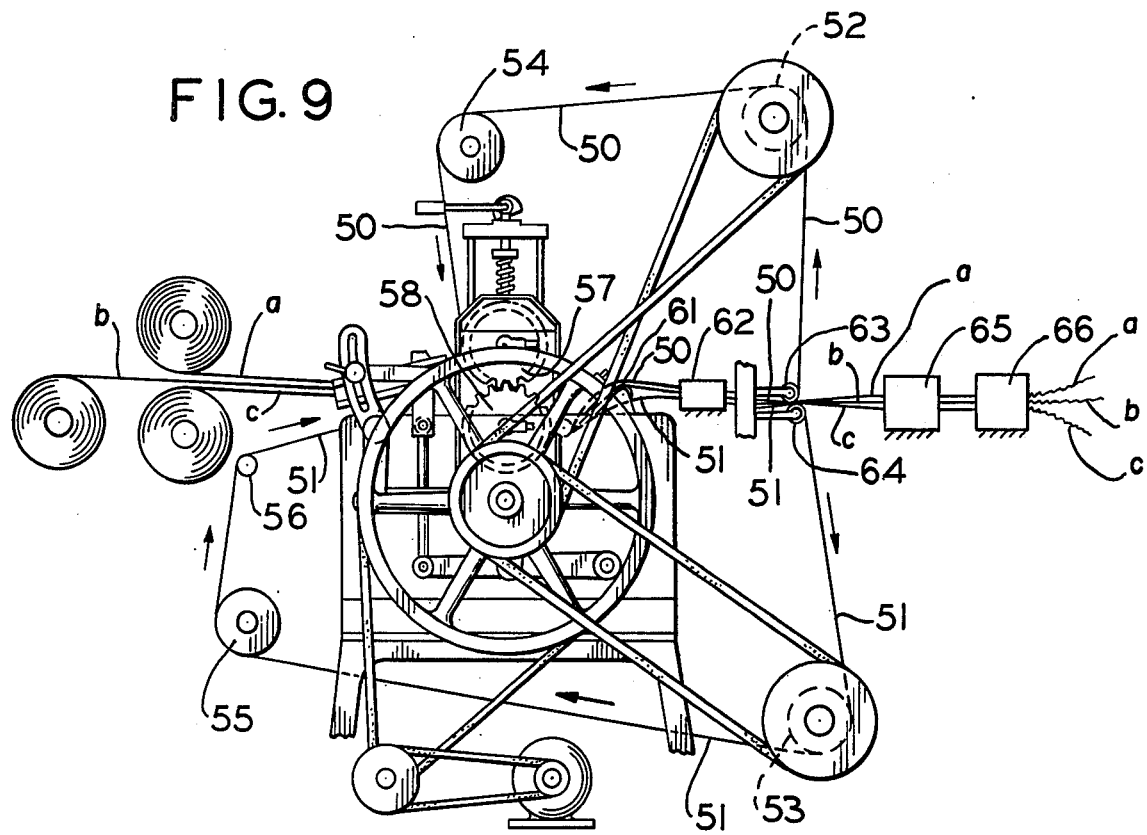
FIG. 9 is a view similar to FIG. 1, showing a further modification of the machine.
Figure 10:
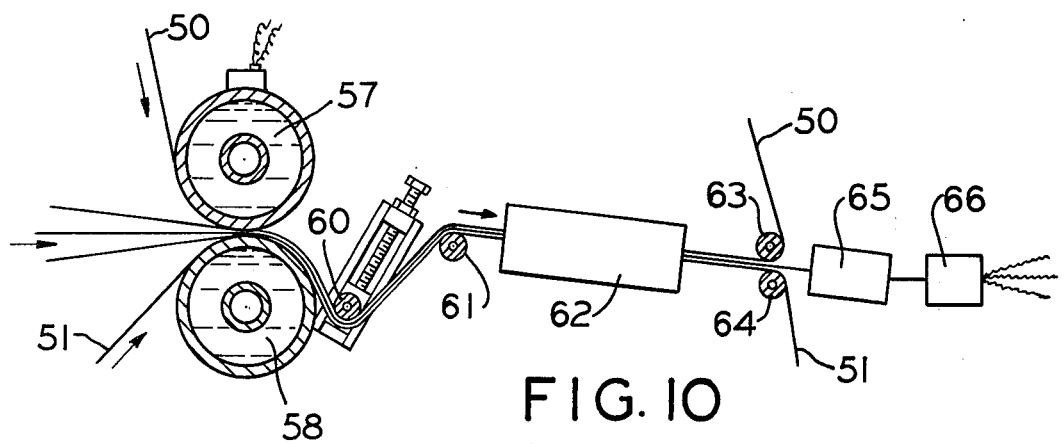
FIG. 10 is an enlarged fragmentary view, similar to FIG. 2, showing the modification of FIG. 9.
Figure 11:
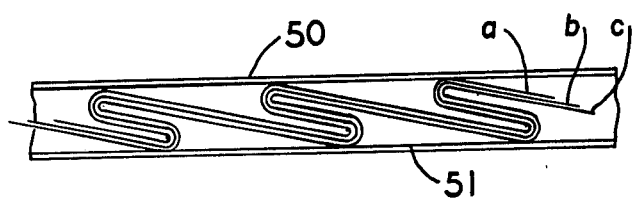
FIG. 11 is a view similar to FIG. 3, showing the concurrent pleating of three sheets by the machine of FIG. 9.

As illustrated in the modification in FIGS. 9 through 11, instead of using the paper pressing sheets 31 and 32 for holding the pleated sheets indicated at a, b, and c, respectively, in the flat condition as they pass from the heating rollers through the cooling rolls, suitable flexible endless belts 50 and 51 are provided. The belts 50 and 51 pass around suitable associated supporting and driving rolls 52 and 53 and guide rolls 54 and 55, and, in the case of belt 51, a supplemental guide roll 56. Thus they are brought into embracing and flat pressing relation to the two outermost sheets of plastic being fed through the machine after the sheets are pleated. They initially engage the outwardly exposed faces of these outermost pleated sheets at a location just in advance of heated pressing rolls 57 and 58 and continue in this relation through cooling rolls 60 and 61 and additional cooling means, indicated at 62.

The material selected for the belts may vary, depending upon the effects desired. If those areas of the plastic sheets to be engaged by the belts are to remain clear, then the belts should be made of very thin, but highly polished steel or other flexible sheet material, so as not to make any imprint on, or change the surface texture of, the plastic sheets against which they bear. On the other hand, if such belt engaged areas are to be only translucent to varying degrees, instead of transparent, then the belts 50 and 51 may be made of woven material or material having a textured pattern. Such material tends to leave a slight surface imprint, thus reducing the transparency, but again, dulling the engaged surfaces so that coating material subsequently applied can adhere thereto more readily. Again, the belts 50 and 51 may be of suitable sheet plastic material of sufficient thickness, stiffness, and resistance to stretch under the applied heat, to hold the pleated sheets in flat pleated condition.

In the present instance, the belts 50 and 51 are moved away from the two interfitting pleated sheets as the sheets issue from guide rolls 63 and 64, so that pleated sheets pass through a suitable coating device, indicated at 65 in FIG. 10, in which the outermost exposed faces of the outermost pleated sheets are coated concurrently with a flowable coating material, by suitable rolls or sprays or the like, while the sheets remain set in flat condition. After coating, the pleated sheets pass into a suitable drier 66, in which enough heat is applied for drying the applied coat.

Thus all of the sheets are driven concurrently through the apparatus along a predetermined path at the same rate while they are juxtaposed in direct face to face contact with each other and are unattached to each other. As facewise aligned portions of the group of sheets pass successively a pleating station, the portions currently at the station are pleated simultaneously into a series of parallel substantially identical flat pleats with the pleats of each sheet interfitting corresponding pleats of the other sheet and each pleat being partially overlapped by and partially overlapping those adjacent pleats of the same sheet between which it is positioned endwise of the sheets. Accordingly, all of the pleats of each sheet are identical with each other and with the pleats of the other sheets. Each pleat in each sheet has common edges with those adjacent pleats of the same sheet between which pleats it is disposed endwise of the sheets.

A distinct advantage results from pleating two plastic sheets concurrently. For example, as illustrated in FIG. 4, the lower sheet 42 is coated at the exposed portions of its lower outer face, providing show portions 72. Thus it will be seen from FIGS. 4 through 8, that when the coated sheets are tensioned to open the pleats, the lower sheet 42 has contiguous clear or shade portions 74 and 75, alternating with show portions 72, and the upper sheet 26 has like contiguous clear or shade portions 76 and 77, alternating with the coated or show portions 73.

Figure 6:
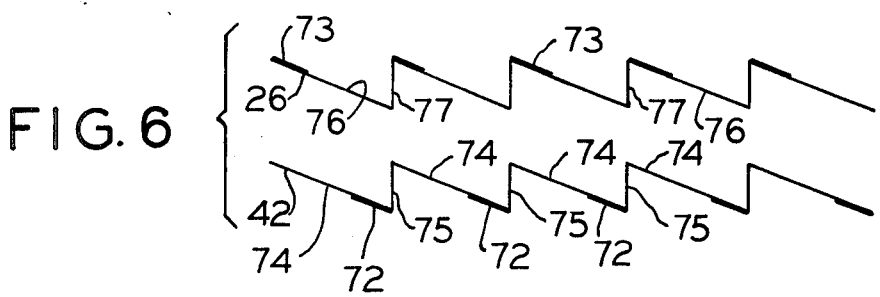
FIG. 6 is a view of the fragments of sheets of FIG. 5, showing them separated while still oriented as in FIG. 5.
Figure 7:
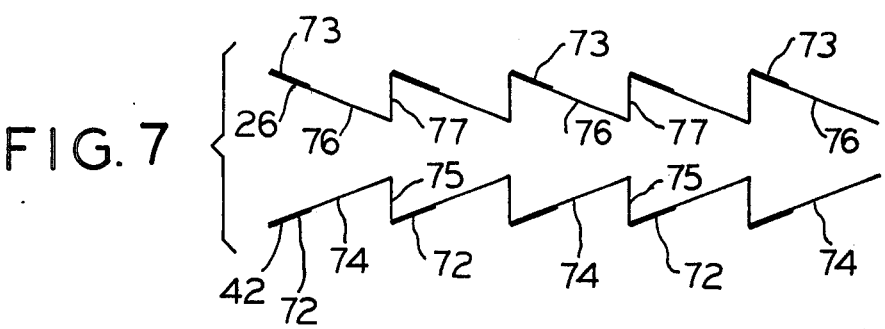
FIG. 7 is a side elevation of the fragments of the two sheets of FIGS. 5 and 6, showing the lower sheet rotated, relative to the upper sheet, 180° edgewise about an axis normal to the plane of the lower sheet.
Figure 8:
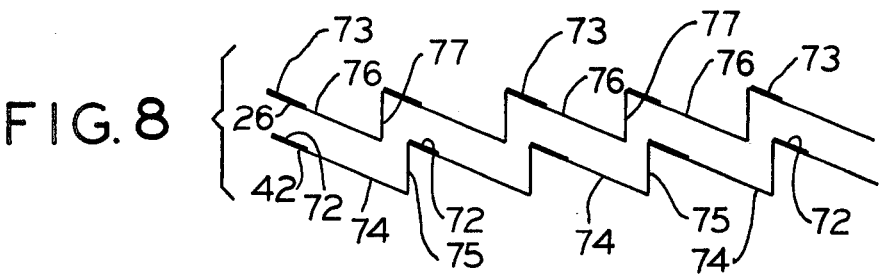
FIG. 8 is a view of the fragments of the sheets shown in FIG. 7, with the lower sheet rotated, relative to the upper sheet, 180° about a longitudinal axis from the position illustrated in FIG. 7.

As illustrated in FIG. 6, if the two pleated plastic sheets 26 and 42 are separated, they are identical, but the show areas of one alternate, endwise of the sheets, with the show areas of the other. Then, if one of these sheets, for example, sheet 42, is rotated edgewise about an axis normal to its plane, the sheets will have the relative positions shown in FIG. 7, wherein the pleats are 180° out of orientation. If, then, the lower sheet 42 is rotated flatwise about its longitudinal axis, its pleats, show areas, and shade areas then are in registry flatwise of the sheets, and oriented in all respects the same as those of the upper sheet 26, as illustrated in FIG. 8. Thus two coated sheets, identical in every way are provided.

As has been noted, the sheets to be pleated may comprise a single plastic sheet with a paper companion or carrier sheet therebeneath. Again, two juxtaposed plastic sheets may be passed in face to face contact through the machine without any additional companion sheet, and greater consistency in quality is obtained than with a single sheet. Furthermore, two plastic sheets with a paper companion sheet may be passed simultaneously through the machine, in which case the paper sheet preferably is between the plastic sheets or beneath the lower one of the two plastic sheets. By locating the paper sheet between the two plastic sheets, both of the plastic sheets can be coated concurrently on their outer faces while the companion paper sheet remains therebetween, whereas, if a paper companion sheet is disposed beneath the lower plastic sheet, it must be removed before the coating of the lower sheet can be performed. If desired, more than three plastic sheets can be pleated at the same time, but they must be separated before all can be coated.

Having thus described my invention, I claim:

1. A method producing in an apparatus, concurrently, a plurality of pleated plastic sheets so that they have duplicate pleats, including the steps of:
    (a) arranging a group of at least two very thin sheets, of material to be pleated, in face to face layered relation to each other with the juxtaposed faces of adjacent sheets in unattached, freely separable, condition and with at least two sheets of the group being very thin transparent platic sheet material of a thickness of from 1 to 10 mils, and with one of said two sheets exposed at, and forming, one face of the group and the other of said two sheets being at, and forming, the other face of the group;
    (b) mechanically maintaining the sheets in said layered relation, in separable condition, and in fixed relation to each other edgewise and endwise and, while so maintaining the sheets of the group, introducing the group into said apparatus and therein advancing the group endwise, unidirectionally, along a predetermined path to cause successive longitudinal portions of said group, each of which group portions comprises facewise aligned portions of the sheets, respectively, to pass successively through a pleating station;
    (c) at said pleating station, folding each group portion, as a unit, when it is currently at said station, to form the sheet portions of said group portion concurrently into a plurality of regular transverse like pleats, in which each pleat in each sheet has common edges with those adjacent pleats of the same sheet, between which pleats it is disposed endwise of the sheets, and in which each pleat of each sheet is interfitted fully within the concurrently formed like pleat in an adjacent juxtaposed sheet, and in which one side of each interfitted pleat overlaps and shields a part of the outwardly facing face of the contiguous side of the pleat next adjacent to said one side, endwise of the sheets, leaving a remainder area of said outwardly facing face exposed, so that the shape and area of said remainder area of said contiguous side of each pleat in said two outer sheets faces outwardly facewise of the group, and all of said remainder areas of the pleats of all of the sheets are substantially identical;
    (d) then, along a succeeding portion of said path, simultaneously pressing flat and heating said portions of said group of sheets, while they remain in the group, to dispose the pleats in said flat pressed, interfitted, and overlapped condition after the pleats have been formed;
    (e) thereafter, at another succeeding portion of said path, while maintaining said pleated portions of the group of sheets in said flat pressed condition, cooling the group of pleated sheets at said portions until the pleats are set normally in said flat pressed condition; and
    (f) subsequently separating the sheets from each other.

2. The method according to claim 1 wherein flowable coating material is applied subsequently to the faces, respectively, of said two outer sheets so as to cover entirely the corresponding remainder areas of said sides of said pleats while the pleats are in flat pressed condition.

3. The method according to claim 2 wherein flowable coating material is applied to said remainder areas of said pleats of each of said two sheets which are exposed at the outer faces of the group while the sheets remain in the group in flat pressed condition, to provide, by said outer sheets, two pleated plastic sheets with identical pleats, and with corresponding coated remainder areas.

4. The method according to claim 3 wherein the coating material is applied concurrently to said remainder areas of said outer faces of said two outer sheets while the sheets are being passed, as a group, in said original flat pressed condition, through said apparatus.

5. The method according to claim 1 wherein said group of sheets consists of only said two outer sheets, and said two outer sheets are juxtaposed in face to face relation with their adjacent faces in direct contact with each other.

6. The method according to claim 5 wherein coating material is applied concurrently to said outer faces of said two outer sheets while the sheets remain in said group in said original flat pressed condition.

7. The method according to claim 1 wherein said outer plastic sheets of the group are plastic sheets selected from the group consisting of nylon, cellulose acetate, polycarbonates, polyvinyl chloride, and polyester.

8. The method according to claim 1 wherein a sheet of paper is disposed between said two outer sheets in face to face contact therewith and is pleated concurrently with said two outer sheets with duplicate pleats interfitting, at the inner faces of the two outer sheets, with the pleats of said two outer sheets.

9. The method according to claim 1 wherein another sheet of the same plastic material within said range of thickness is disposed between said two outer sheets in face to face contact therewith and is pleated concurrently with said two outer sheets with duplicate pleats interfitting, at the inner faces of the two outer sheets, with the pleats of said two outer sheets.

* * * * *

UNITED STATES PATENT AND TRADEMARK OFFICE
CERTIFICATE OF CORRECTION

PATENT NO. : 4,198,366
DATED : April 15, 1980
INVENTOR(S) : Sergius N. Ferris Luboshez It is certified that error appears in the above-identified patent and that said Letters Patent are hereby corrected as shown below:

Page 1, Col. 1, after "Inventor" read --Sergius N. Ferris Luboshez--.
Page 1, Abstract, line 15, for "plates" read --pleats--.
Col. 4, line 33, for "plates" read --pleats--.
Col. 6, line 17, for "platic" read --plastic--.

Signed and Sealed this

Fifteenth Day of July 1980

[SEAL]

Attest:

SIDNEY A. DIAMOND

Attesting Officer

Commissioner of Patents and Trademarks